(12) United States Patent
Shin et al.

(10) Patent No.: US 7,746,436 B2
(45) Date of Patent: Jun. 29, 2010

(54) DISPLAY PANEL

(75) Inventors: Kyoung Ju Shin, Yongin-si (KR);
Chong Chul Chai, Seoul (KR); Hyun Wuk Kim, Yongin-si (KR); Hee Wook Do, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 741 days.

(21) Appl. No.: 11/560,940

(22) Filed: Nov. 17, 2006

(65) Prior Publication Data
US 2007/0115414 A1 May 24, 2007

(30) Foreign Application Priority Data
Nov. 18, 2005 (KR) .................. 10-2005-0110597

(51) Int. Cl.
*G02F 1/1337* (2006.01)
(52) U.S. Cl. .................. 349/129; 349/139; 349/143; 349/146
(58) Field of Classification Search .......... 349/129, 349/139, 143, 144, 146
See application file for complete search history.

(56) References Cited

U.S. PATENT DOCUMENTS 7,466,386 B2 * 12/2008 Kim .................. 349/143
2005/0219452 A1 * 10/2005 Chen et al. .......... 349/143

* cited by examiner

*Primary Examiner*—Sarah Song
(74) *Attorney, Agent, or Firm*—Cantor Colburn LLP

(57) ABSTRACT

A display panel includes a first substrate, a second substrate and a liquid crystal layer. The first substrate includes a plurality of pixel electrodes in a plurality of lower pixel portions, respectively, and each of the pixel electrodes includes a plurality of lower openings spaced apart from each other. The second substrate includes a common electrode including a plurality of upper openings spaced apart from each other in a plurality of upper pixel portions corresponding to the lower pixel portions, respectively. The upper openings are connected to each other between adjacent upper pixel portions in a first direction. The liquid crystal layer is interposed between the first and second substrates.

19 Claims, 16 Drawing Sheets

FIG.2
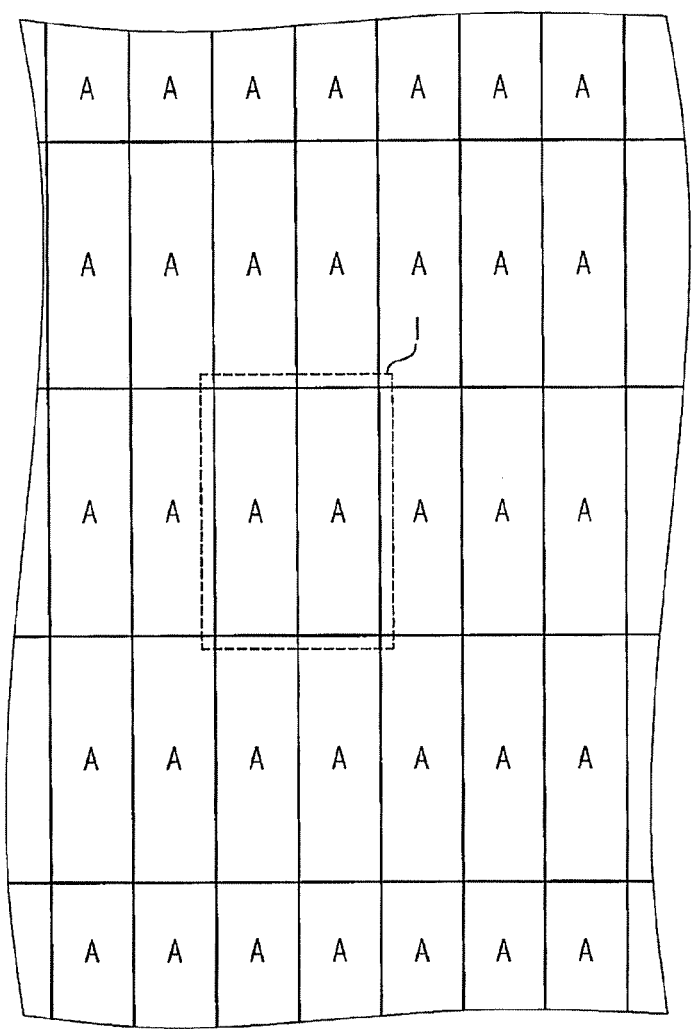
SECOND DIRECTION
 FIRST DIRECTION

SECOND DIRECTION

FIRST DIRECTION

SECOND DIRECTION

FIRST DIRECTION

FIG.12
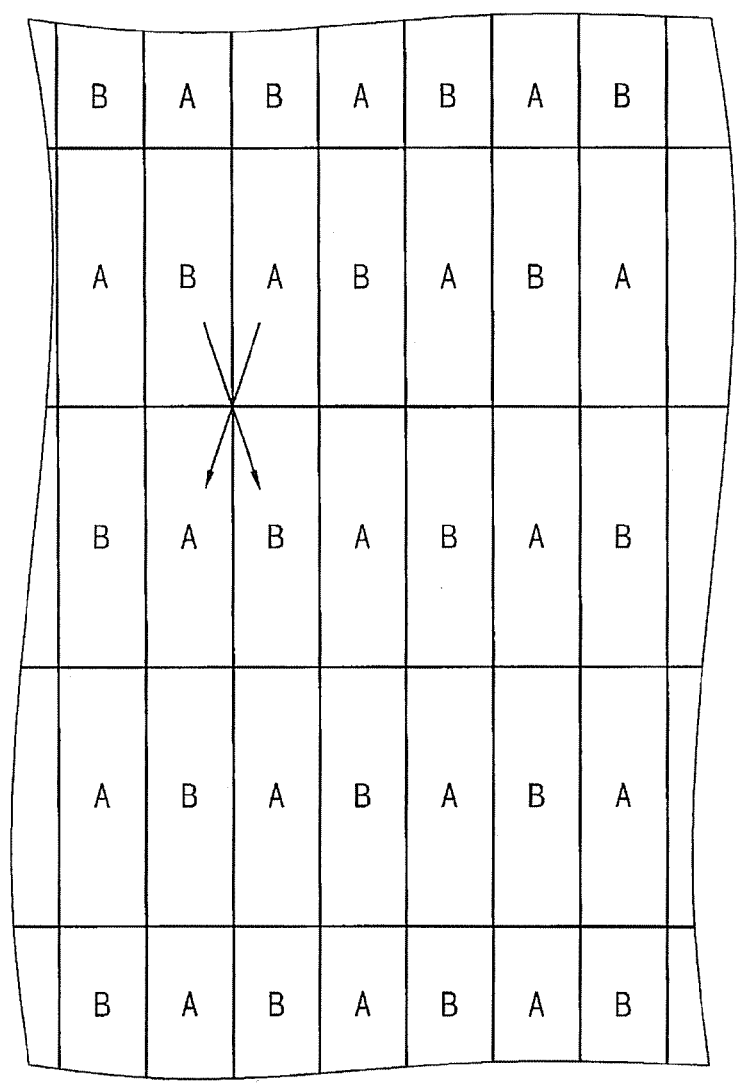

DISPLAY PANEL

The present application claims priority to Korean Patent Application No. 2005-110597, filed on Nov. 18, 2005, and all the benefits accruing therefrom under 35 U.S.C. §119, the contents of which are incorporated herein by reference in its entirety.

BACKGROUND OF THE INVENTION

1. Field of the Invention

The present invention relates to a display panel. More particularly, the present invention relates to a display panel capable of improving image display quality.

2. Description of the Related Art

A liquid crystal display ("LCD") device that is one of flat panel display devices, includes an LCD panel and a backlight assembly. The LCD panel displays images using a light transmittance of liquid crystals. The backlight assembly is disposed under the LCD panel to supply the LCD panel with light.

The LCD panel includes an array substrate, a color filter substrate and a liquid crystal layer. The array substrate includes a plurality of thin film transistors. The color filter substrate includes a plurality of color filters. The liquid crystal layer is interposed between the array substrate and the color filter substrate.

The array substrate includes a plurality of gate lines, a plurality of data lines and a plurality of pixels. The gate lines cross the gate lines. The pixels are defined by the gate and data lines. Each of the thin film transistor and a pixel electrode electrically connected to the thin film transistor are formed in each of the pixels. The pixel electrodes formed in the pixels are spaced apart from each other and are arranged in a matrix shape.

In order to minimize interference between adjacent pixel electrodes, the array substrate includes a black matrix between the adjacent pixel electrodes. However, the black matrix decreases opening ratio of the pixels.

The liquid crystal layer of the LCD panel includes a twist nematic ("TN") mode, an in plane switching ("IPS") mode, a vertical alignment ("VA") mode, etc. The liquid crystal layer of the VA mode has rapid response speed, and has been widely used. In order to increase a viewing angle of the LCD panel having the VA mode, a patterned vertical alignment ("PVA") mode, a multi-domain vertical alignment ("MV"A) mode, etc., have been devised.

The LCD panel having the PVA mode or the MVA mode includes a plurality of pixels. A thin film transistor and a pixel electrode are formed in each of the pixels. In order to increase the viewing angle of the LCD panel, each of the pixels is divided into a plurality of domains. However, when the pixel electrodes on the pixels having the domains are spaced apart from each other, the opening ratio of the display panel is decreased.

BRIEF SUMMARY OF THE INVENTION

Exemplary embodiments provide a display panel capable of improving image display quality.

An exemplary embodiment of a display panel includes a first substrate, a second substrate and a liquid crystal layer. The first substrate includes a plurality of pixel electrodes in a plurality of lower pixel portions, respectively, and each of the pixel electrodes includes a plurality of lower openings spaced apart from each other. The second substrate includes a common electrode including a plurality of upper openings spaced apart from each other in a plurality of upper pixel portions corresponding to the lower pixel portions, respectively. The upper openings are connected to each other between adjacent upper pixel portions that are adjacent to each other in a first direction. The liquid crystal layer is interposed between the first and second substrates. The upper pixel portions may be arranged in a matrix shape in the first direction and a second direction that is substantially in perpendicular to the first direction.

In an exemplary embodiment, the upper openings in each of the upper pixel portions may have a substantially same shape as the upper openings in an adjacent upper pixel portion. In an exemplary embodiment, the upper openings in every two of the upper pixel portions may have a substantially same shape as the upper openings in adjacent two upper pixel portions that are adjacent in the first direction.

In an exemplary embodiment, when the upper openings in every two of the upper pixel portions have a substantially same shape as the upper openings in adjacent two upper pixel portions, a plurality of first upper openings on a first upper pixel portion may have a different shape from a plurality of second upper openings on a second upper pixel portion. Each of a plurality of starting points of the second upper openings may be on a center between lines extended from adjacent starting points of the first upper openings in the first direction.

In an exemplary embodiment, the upper openings may include a plurality of upper main openings in the upper pixel portions and an upper connection opening formed between the adjacent upper pixel portions to connect the upper main openings. The upper connection opening may be extended in a direction different from a longitudinal direction of each of the upper main openings. The upper connection opening may have a greater width than each of the upper main openings. In an exemplary embodiment, a display panel includes a first substrate, a second substrate and a liquid crystal layer. The first substrate includes a lower substrate including a plurality of lower pixel portions, a plurality of thin film transistors on the lower pixel portions, a plurality of pixel electrodes electrically connected to the thin film transistors, respectively, and a plurality of lower domain dividing parts formed in the lower pixel portions. The lower domain dividing parts are spaced apart from each other. The second substrate includes an upper substrate, a common electrode on a substantially entire surface of the upper substrate and a plurality of upper domain dividing parts spaced apart from each other in a plurality of upper pixel portions corresponding to the lower pixel portions, respectively. The upper domain dividing parts and the lower domain dividing parts define a plurality of domains. The liquid crystal layer is interposed between the first and second substrates. The upper domain dividing parts are connected to each other in adjacent upper pixel portions that are adjacent to each other in a first direction.

In an exemplary embodiment, the lower domain dividing parts may include a plurality of openings from which the pixel electrodes are partially removed and the upper domain dividing parts may include a plurality of openings from which the common electrode is partially removed.

In an exemplary embodiment, the lower domain dividing parts may include a plurality of protrusions that are protruded from the pixel electrodes and the upper domain dividing parts may include a plurality of protrusions that are protruded from the common electrode.

In an exemplary embodiment a portion of the lower and upper domain dividing parts may include a protrusion and a remaining portion of the lower and upper domain dividing parts may include an opening from which the pixel electrodes or the common electrode is partially removed.

In an exemplary embodiment, the openings in the adjacent upper pixel portions are connected to each other so that the domains formed between the first and second substrates are connected to each other and an opening ratio is improved so that an image display quality is improved.

BRIEF DESCRIPTION OF THE DRAWINGS

The above and other advantages of the present invention will become more apparent by describing in detail example embodiments thereof with reference to the accompanying drawings, in which:

FIG. 2 is a plan view illustrating an exemplary embodiment of pixels of the display panel shown in FIG. 1;

FIG. 12 is a plan view illustrating another exemplary embodiment of pixels of a display panel in accordance with the present invention;

DETAILED DESCRIPTION OF THE INVENTION

Figure 1:
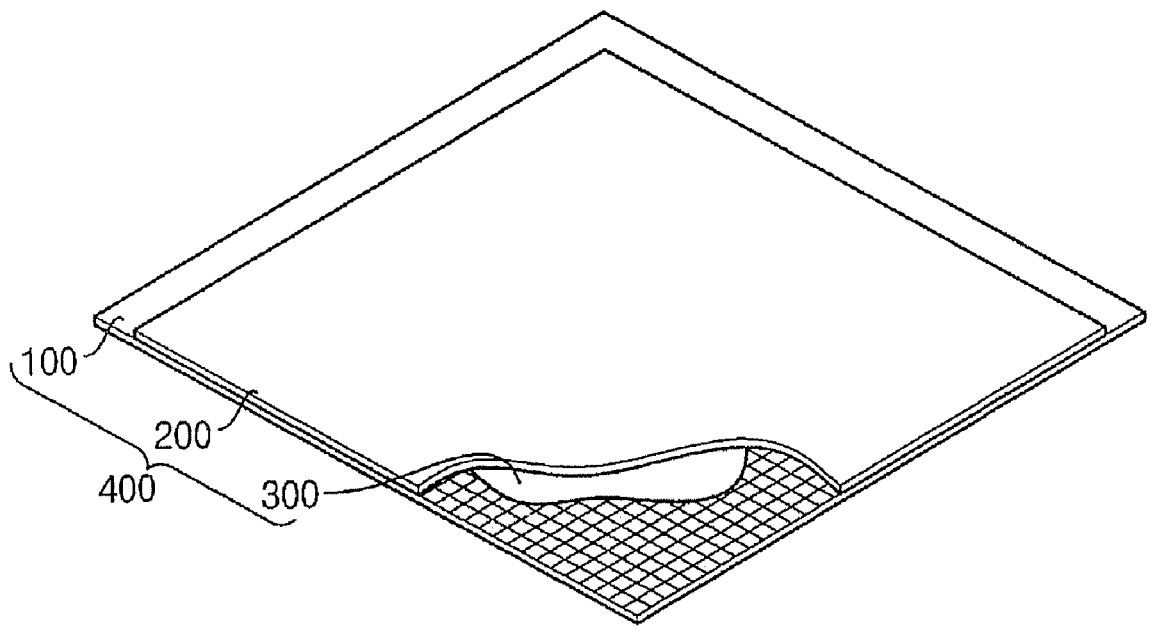
FIG. 1 is a plan view illustrating an exemplary embodiment of a display panel in accordance with the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on," "connected to" or "coupled to" another element or layer, it can be directly on or connected to the other element or layer or intervening elements or layers may be present. In contrast, when an element is referred to as being "directly on" or "directly connected to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "lower," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "lower" relative to other elements or features would then be oriented upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be described in detail with reference to the accompanying drawings.

FIG. 1 is a plan view illustrating an exemplary embodiment of a display panel in accordance the present invention.

Referring to FIG. 1, the display panel 400 includes a first substrate 100, a second substrate 200 and a liquid crystal layer 300. The display panel 400 displays images based on a light.

The first substrate 100 includes a plurality of pixel electrodes, a plurality of thin film transistors and a plurality of signal lines. The pixel electrodes are arranged substantially in a matrix shape. The thin film transistors apply driving voltages to the pixel electrodes. The signal lines transmit signals to the thin film transistors.

The second substrate 200 faces the first substrate 100. The second substrate 200 includes a common electrode and a plurality of color filters. The common electrode is on a substantially entire surface of the second substrate 200 facing the first substrate 100. The common electrode includes a transparent conductive material. The color filters are on the surface of the second substrate 200 facing the first substrate 100. In exemplary embodiments, the color filters may include red, green and/or blue color filter portions.

The liquid crystal layer 300 is interposed between the first and second substrates 100 and 200. Liquid crystals of the liquid crystal layer 300 vary in arrangement in response to an electric field formed between the pixel electrodes and the common electrode. Thus, a light transmittance of the liquid crystal layer 300 is changed so that light having passed through the color filters displays the images.

FIG. 2 is a plan view illustrating an exemplary embodiment of pixels of the display panel shown in FIG. 1.

Figure 3:
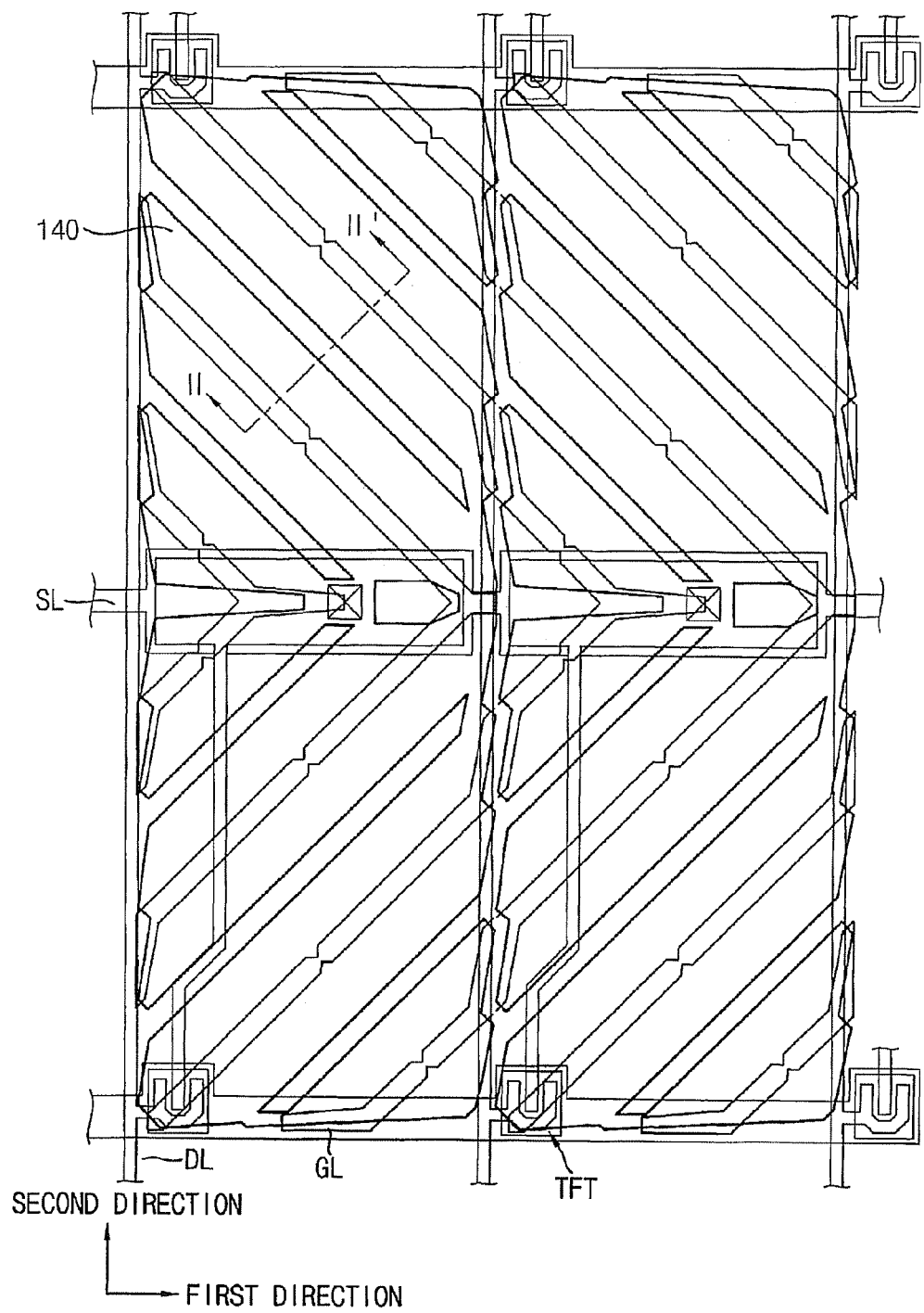
FIG. 3 is an enlarged plan view illustrating portion 'I' of FIG. 2.
Figure 4:
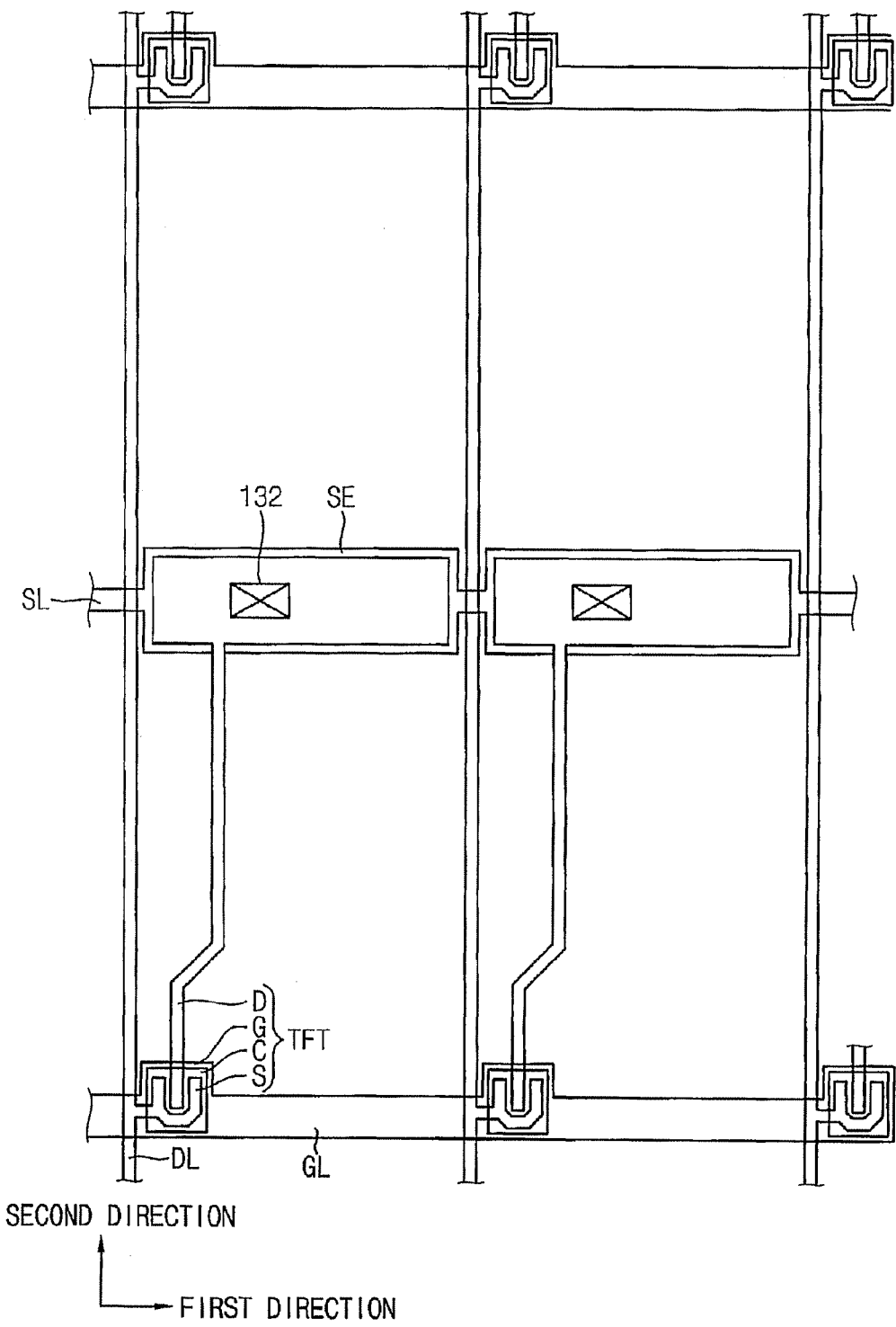
FIG. 4 is a plan view illustrating an exemplary embodiment of signal lines and a thin film transistor of the pixel shown in FIG. 2.

Referring to FIGS. 1 and 2, the display panel 400 includes the pixels 'A' to display the images. Each of the pixels 'A' is a minimum unit to display the images. In particular, the pixels 'A' have a substantially same shape, and are arranged in a matrix shape in a first direction and a second direction that is substantially in perpendicular to the first direction. The pixels 'A' include a plurality of lower pixel portions formed on the first substrate 100 and a plurality of upper pixel portions formed on the second substrate 200. The lower pixel portions of the first substrate 100 correspond in location and/or dimension to the upper pixel portions of the second substrate 200, respectively. FIG. 3 is an enlarged plan view illustrating portion 'I' of FIG. 2. FIG. 4 is a plan view illustrating an exemplary embodiment of signal lines and a thin film transistor of the pixel shown in FIG. 2.

Referring to FIGS. 3 and 4, the first substrate 100 of the display panel 400 includes a gate line GL, a data line DL, a thin film transistor TFT, a pixel electrode 140 and a storage line SL. In an alternative exemplary embodiment, the first substrate 100 of the display panel 400 may further include a plurality of gate lines GL, a plurality of data lines DL, a plurality of thin film transistors TFTs, a plurality of pixel electrodes 140 and a plurality of storage lines SL.

The gate lines GL are extended in the first direction, and are aligned in the second direction. The data lines DL are extended in the second direction, and are aligned in the first direction. The data lines DL cross the gate lines GL.

The data lines DL cross the gate lines GL to form the lower pixel portions. The thin film transistors TFT and the pixel electrodes 140 are formed on the upper pixel portions, respectively.

The thin film transistor TFT is formed on each of the lower pixel portions, and is electrically connected to one of the data lines DL and one of the gate lines GL. The thin film transistor TFT includes a gate electrode G, a source electrode S, a drain electrode D and an active layer C.

The gate electrode G is branched from one of the gate lines GL in the second direction. The source electrode S is branched from one of the data lines DL in the first direction. As in the illustrated embodiments, a portion of the source electrode S may have a U-shape. The source electrode S is formed on the gate electrode G and the gate line DL.

The drain electrode D is spaced apart from the source electrode S and faces the source electrode S. In an exemplary embodiment, the drain electrode D may be interposed between the U shaped source electrode S. The drain electrode D is overlapped with the gate line GL. The drain electrode D is extended in the second direction and is electrically connected to the pixel electrode 140 through a contact hole 132.

The active layer C is formed between the source electrode S and the drain electrode D on the gate electrode G. In an exemplary embodiment, the active layer C may cover the source electrode S.

The pixel electrode 140 is formed in each of the pixels 'A' (shown in FIG. 1). The pixel electrode 140 includes a transparent conductive material. The pixel electrode 140 is electrically connected to the thin film transistor TFT through the contact hole 132. The driving voltage is applied to the pixel electrode 140 through the thin film transistor TFT.

In exemplary embodiments, the transparent conductive material that can be used for the pixel electrode 140 may include, but is not limited to, indium tin oxide ("ITO"), indium zinc oxide ("IZO"), amorphous indium tin oxide ("a-ITO"), etc. In one exemplary embodiment, a transparent conductive layer including the transparent conductive material is patterned using a photolithography process.

The storage line SL may be formed from a substantially same layer as the gate line GL, and a storage electrode SE that is in each of the pixels A is electrically connected to the storage line SL. In one exemplary embodiment, the storage electrode SE is spaced apart from the drain electrode D. The storage electrode SE and the drain electrode D form a storage capacitor that maintains a voltage difference between the pixel electrode 140 and a common electrode of the second substrate 200.

Figure 5:
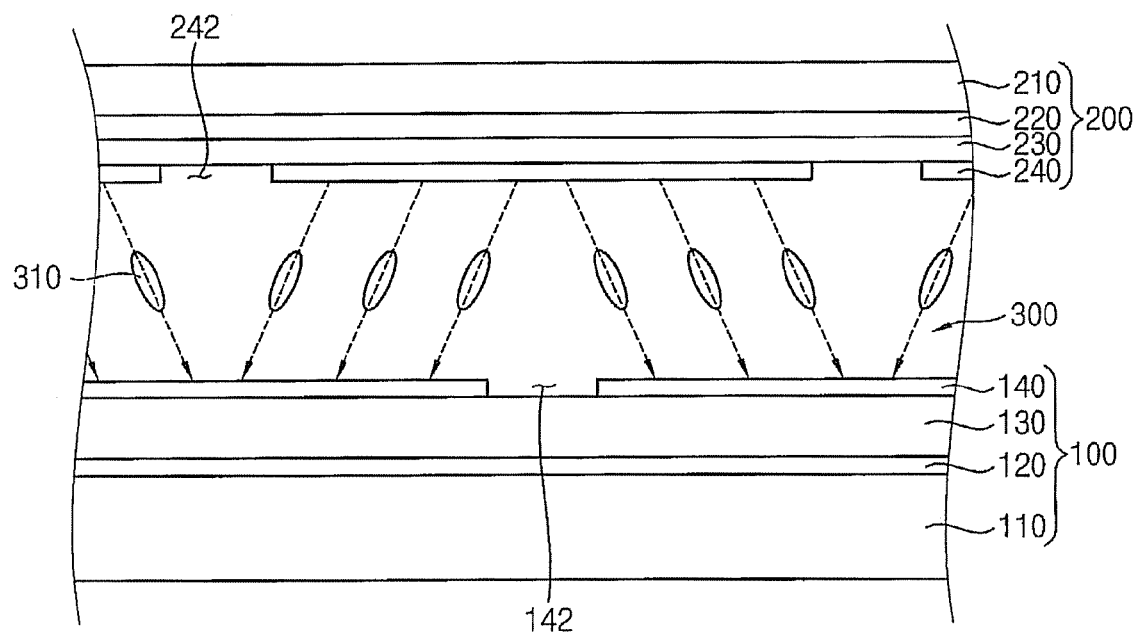
FIG. 5 is a cross-sectional view taken along line II-II' shown in FIG. 3.

FIG. 5 is a cross-sectional view taken along line II-II' shown in FIG. 3.

Referring to FIGS. 3 and 5, the display panel 400 includes the first substrate 100, the second substrate 200 and the liquid crystal layer 300.

The first substrate 100 includes a first transparent substrate 110, a gate insulating layer 120, a passivation layer 130, the pixel electrode 140 and a lower domain dividing part 142.

The first transparent substrate 110 has a substantially plate shape and includes a transparent material. Exemplary embodiments of the transparent material that can be used for the first transparent substrate 110 may include, but are not limited to, glass, quartz, sapphire, a transparent synthetic resin such as polyester, polyacrylate, polycarbonate, polyetherketone, etc.

The gate lines GL and the storage lines SL are formed on the first transparent substrate 110. The gate lines GL are extended in the first direction. The storage lines SL are extended in the first direction. The gate electrodes G are extended from the gate lines GL in the second direction.

The gate insulating layer 120 is formed on the first transparent substrate 120 to cover the gate lines GL, the storage lines SL and the gate electrodes G. The gate insulating layer 120 includes a transparent insulating material. Exemplary embodiments of the transparent insulating material that can be used for the gate insulating layer 120 may include, but are not limited to, silicon oxide, silicon nitride, etc. The data lines DL are formed on the gate insulating layer 120 and are extended in the second direction. The source electrodes S are extended from the data lines DL in the first direction.

The passivation layer 130 is formed on the gate insulating layer 120 to cover the thin film transistors TFTs. The passivation layer 130 protects the thin film transistors TFTs from heat and/or moisture that is provided from an exterior to the first substrate 100. The contact hole 132 on the drain electrode D is formed on the passivation layer 130. In alternative exemplary embodiments, a plurality of contact holes 132 on the drain electrodes D may be formed on the passivation layer 130.

The pixel electrode 140 is formed on the passivation layer 130 and is electrically connected to the drain electrode D through the contact hole 132. The pixel electrode 140 is partially removed to form the lower domain dividing part 142. The lower domain dividing part 142 may be considered an opening on which the pixel electrode 140 is partially removed. The lower domain dividing part 142 will be described with reference to the following drawings.

The second substrate 200 includes a second transparent substrate 210, a black matrix (not shown), a color filter 220, an overcoating layer 230, a common electrode 240 and an upper domain dividing part 242.

The second transparent substrate 210 has a substantially plate shape and includes a transparent material. The second transparent substrate 210 faces the first transparent substrate 110 and may include a substantially same material as the first transparent substrate 110.

The black matrix is formed on a portion of the first transparent substrate 110 to block light. In an exemplary embodiment, the black matrix may include an internal light blocking layer and an external light blocking layer. The internal light blocking layer is formed on the second transparent substrate 210, and corresponds to the gate lines GL, the data lines DL, the storage lines SL and the thin film transistors TFTs of the first substrate 100. The internal light blocking layer blocks the light so that the gate lines GL, the data lines DL, the storage lines SL and the thin film transistors TFTs are not detected from an exterior to the display panel. The external light blocking layer is formed on an external surface of the second transparent substrate 210 to block the light.

The color filter 220 is formed on the second transparent substrate 210 to block the internal light blocking layer. In exemplary embodiments, the color filter 220 may include the red, green and blue color filter portions. The red color filter portion of the color filter 220 transmits red light from white light. The green color filter portion of the color filter 220 transmits green light from white light. The blue color filter portion of the color filter 220 transmits blue light from white light.

The overcoating layer 230 is formed on a substantially entire surface of the second transparent substrate 210 to cover the color filter 220. The overcoating layer 230 planarizes a surface of the color filter 220. In one exemplary embodiment, the overcoating layer 230 may include a transparent organic material.

The common electrode 240 is formed on the overcoating layer 230. The common electrode 240 includes a transparent conductive material. Exemplary embodiments of the transparent conductive material that can be used for the common electrode 240 may include, but are not limited to, indium tin oxide ("ITO"), indium zinc oxide ("IZO"), amorphous indium tin oxide ("a-ITO"), etc. A common voltage is applied to the common electrode 240. The electric field is formed between the common electrode 240 and the pixel electrode 140. In exemplary embodiments, the pixel electrode 140 is partially etched to form the upper domain dividing part 242. That is, the upper domain dividing part 242 is an opening on which the pixel electrode 140 is partially removed. The upper domain dividing part 242 will be described with reference to the following drawings.

The liquid crystal layer 300 is interposed between the first and second substrates 100 and 200 and includes the liquid crystals 310 that have an extended granular shape. The liquid crystals 310 in the domains are aligned in various directions based on the lower domain dividing part 142 and the upper domain dividing part 242. The liquid crystals 310 at sides of the lower domain dividing parts 142 and at sides of the upper domain dividing parts 242 may be inclined in different directions.

As in the illustrated embodiment of FIG. 5, the lower domain dividing part 142 is not overlapped with the upper domain dividing part 242 so that the domains are formed between the first and second substrates 100 and 200. The upper domain dividing part 242 is substantially on a center of adjacent lower domain dividing parts 142 and the lower domain dividing part 142 is substantially on a center of adjacent upper domain driving parts 242. The upper domain dividing part 242 and an adjacent lower domain dividing part 142 that is adjacent to the upper domain dividing part 242 define a domain. In one exemplary embodiment, when the lower domain dividing part 142 is spaced apart from the upper domain dividing part 242 by about 44 micrometers (μm) to about 52 micrometers (μm) when viewed on a plane, a width of each of the domains is about 22 μm to about 26 μm.

Referring to FIG. 5, the liquid crystals 310 interposed between the first and second substrates 100 and 200 are aligned in various directions in the domains. When the liquid crystals 310 are aligned in the various directions a viewing angle of the display panel 400 is increased.

Figure 6:
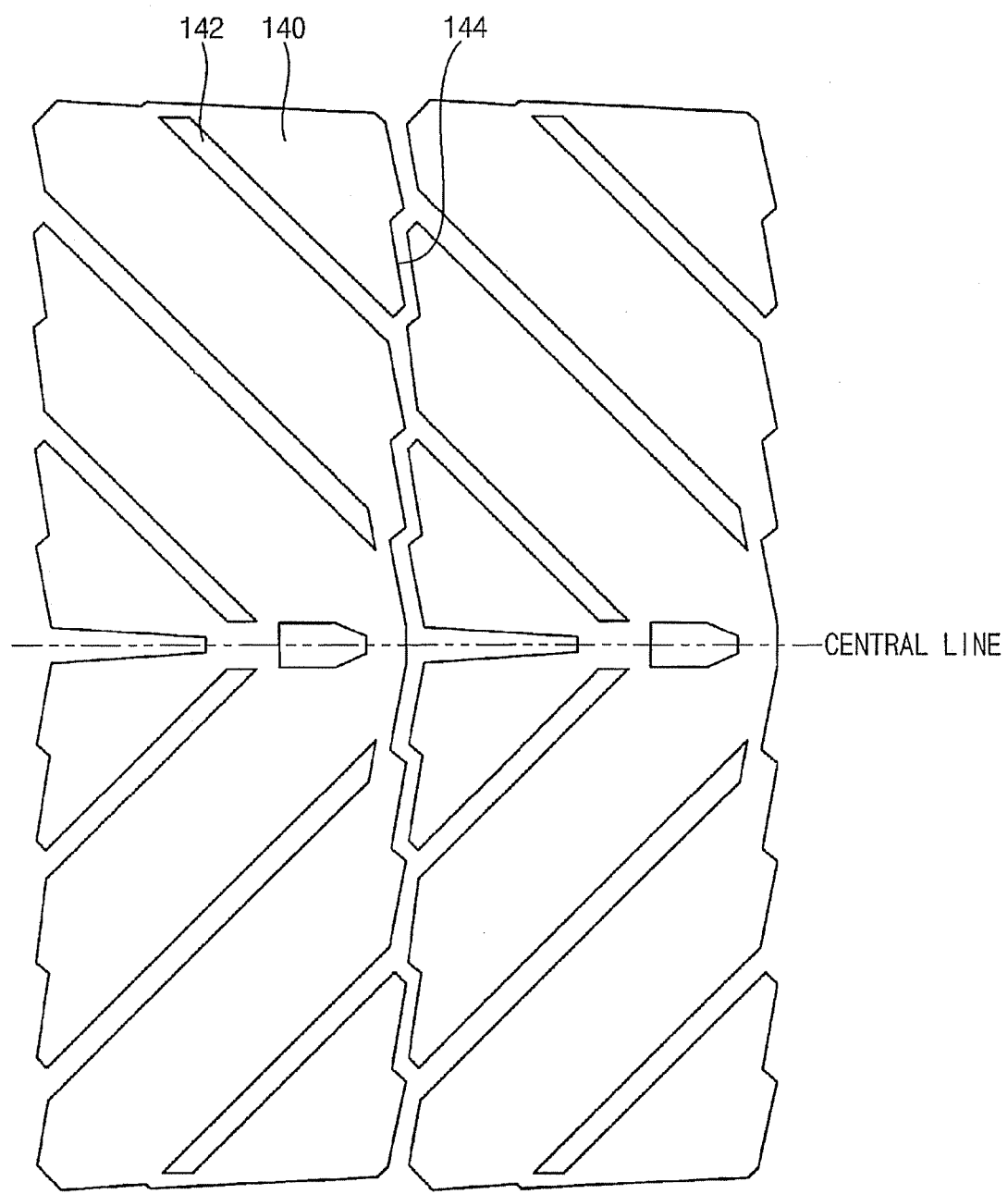
FIG. 6 is a plan view illustrating an exemplary embodiment of a pixel electrode of the pixel shown in FIG. 2.

FIG. 6 is a plan view illustrating an exemplary embodiment of a pixel electrode of the pixel shown in FIG. 2.

Referring to FIGS. 3 and 6, the pixel electrodes 140 are on the lower pixel portions. In one exemplary embodiment, the pixel electrodes 140 formed in the lower pixel portions have a substantially same shape.

The lower domain dividing parts 142 are formed in each of the pixel electrodes 140, respectively. Each of the pixel electrodes 140 is partially etched to form openings that are the lower domain dividing parts 142.

Each of the lower domain dividing parts 142 forms a predetermined angle with respect to the first direction. The lower domain dividing parts 142 are spaced apart from each other in a direction perpendicular to the lower domain dividing parts 142 by substantially a constant distance. In one exemplary embodiment, each of the lower domain dividing parts 142 forms an angle of about 45 degrees with respect to the first direction and the lower domain dividing parts 142 are spaced apart from each other by a distance of about 44 μm to about 52 μm.

Each of the lower domain dividing parts 142 is substantially symmetric with respect to a central line of the pixel electrode 140. The central line may be on a center of the lower pixel portion and substantially parallel with the first direction.

Each of the pixel electrodes is divided by the lower domain dividing parts 142 to form a plurality of sub pixel electrode portions. Each of the pixel electrodes 140 is not completely divided so that the sub pixel electrode portions are electrically connected to each other.

A side 144 of each of the pixel electrodes 140 may have substantially a zigzag shape. That is, the side 144 of each of the pixel electrodes 140 is not a straight line in substantially parallel with the first direction or the second direction. A plurality of inclined lines with respect to the first direction or the second direction are connected to each other to form the zigzag shape. In addition, the sides 144 of adjacent pixel electrodes 140 are spaced apart from each other and correspond to each other in location and/or size.

A lateral electric field may be formed between the sides 144 of the adjacent pixel electrodes 140. When the sides 144 of the adjacent pixel electrodes 140 are the straight lines, a dark line may be displayed on the display panel, thereby deteriorating the image display quality. As illustrated in FIG. 6, however, the sides 144 of the adjacent pixel electrodes 140 having the zigzag shape may dissipate the lateral electric field, thereby improving the image display quality.

Figure 7:
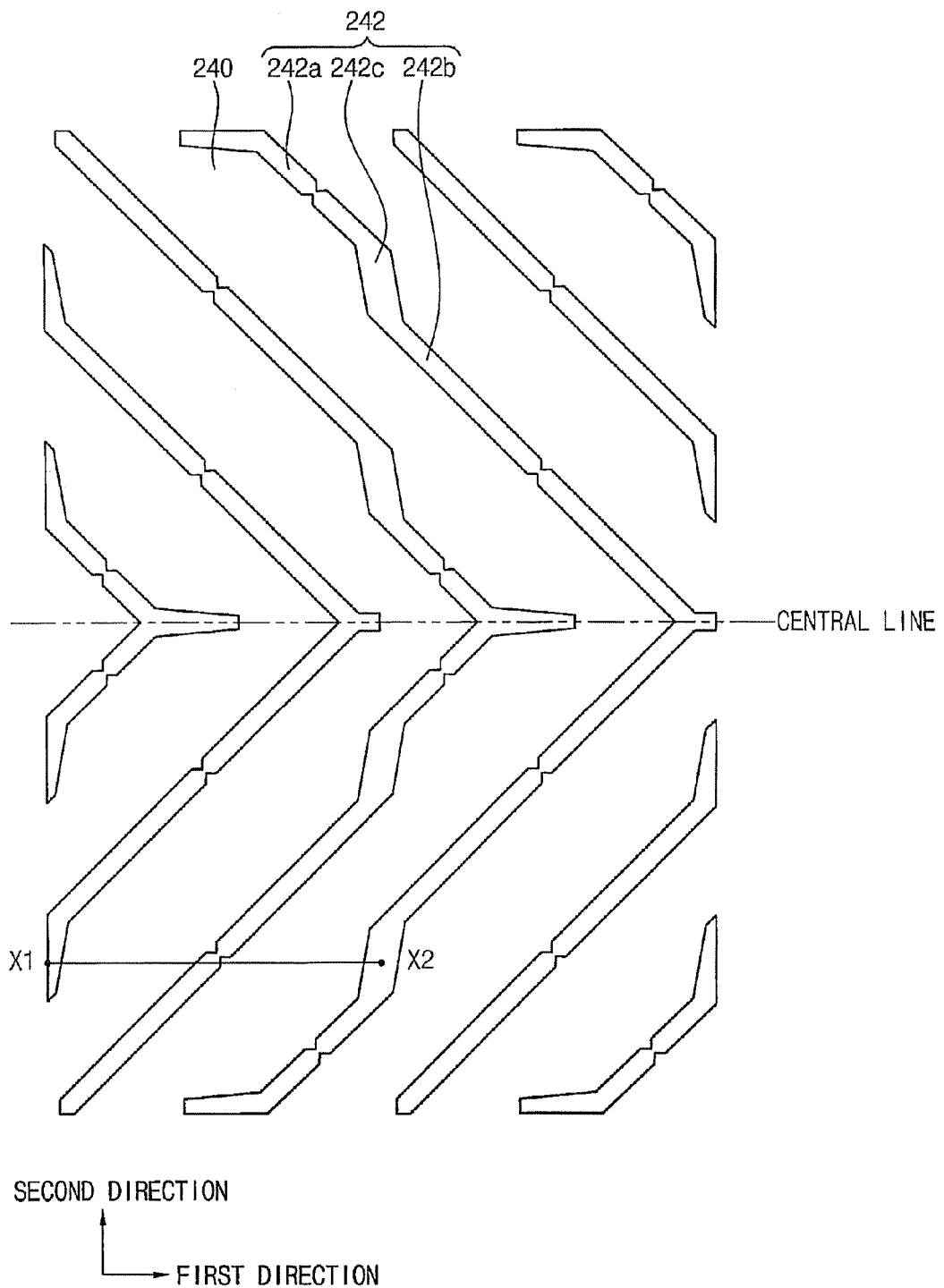
FIG. 7 is a plan view illustrating an exemplary embodiment of a common electrode of the pixel shown in FIG. 2.

FIG. 7 is a plan view illustrating an exemplary embodiment of a common electrode of the pixel shown in FIG. 2.

Referring to FIGS. 3 and 7, the upper domain dividing parts 242 are formed in the common electrode 240. In an exemplary embodiment, the common electrode 240 is partially etched to form the upper domain dividing parts 242. The upper domain dividing parts 242 are formed on the upper pixel portion corresponding to the lower pixel portion.

Each of the upper domain dividing parts 242 forms a predetermined angle with respect to the first direction. The upper domain dividing parts 242 are spaced apart from each other in a direction perpendicular to the upper domain dividing parts 242. In one exemplary embodiment, each of the upper domain dividing parts 242 forms an angle of about 45 degrees with respect to the first direction and the upper domain dividing parts 242 are spaced apart from each other by a distance of about 44 μm to about 52 μm. Each of the upper domain dividing parts 242 is substantially symmetric with respect to a central line in substantially parallel with the first direction.

The upper domain dividing parts 242 may be connected to each other across (or between) pixel portions in the first direction. The upper domain dividing parts 242 in one of the upper pixel portions are connected to the upper domain dividing parts 242 in adjacent upper pixel portions. In one exemplary embodiment, the adjacent two upper pixel portions are adjacent to and connected to each other in the first direction.

Each of the upper domain dividing parts 242 includes a plurality of upper main dividing portions 242*a* and 242*b* and an upper connection dividing portion 242*c*. The upper main dividing portions 242*a* and 242*b* are formed in each of the upper pixel portions. The upper main dividing portions 242*a* and 242*b* are connected through the upper connection dividing portion 242*c*. The upper connection dividing portion 242 is formed between the adjacent upper pixel portions that are adjacent to each other in the first direction so that the main dividing portion 242*a* that is on a left side is connected to the main dividing portion 242*b* that is on a right side.

In FIG. 7, the upper connection dividing portion 242*c* is aligned in a different direction from a longitudinal direction of each of the upper main dividing portions 242*a* and 242*b*. The upper connection dividing portion 242*c* has a greater width in a direction perpendicular to a longitudinal direction of the upper connection dividing portion 242*c* than the upper main dividing portions 242*a* and 242*b*. The upper domain dividing parts 242 are extended in a direction substantially parallel with an extended direction of lower domain dividing parts 142. Each of the lower domain dividing parts 142 is interposed between adjacent upper domain dividing parts 242 when viewed on a plane, such as illustrated in FIG. 3.

The upper connection dividing part 242*c* connects the main dividing portion 242*a* that is on the left side to the adjacent main dividing portion 242*b* that is on the right side.

The upper domain dividing parts 242 in each of the upper pixel portions have a substantially same shape as the upper domain dividing parts 242 in the adjacent upper pixel portion. As in the illustrated exemplary embodiment, a starting point X1 of one of the upper domain dividing parts 242 of one of the upper pixel portions is on a substantially same position of a starting point X2 of another of the upper domain dividing parts 242 of the adjacent upper pixel portion. Starting points of the upper domain dividing parts 242 of one of the upper pixel portions are on the substantially same position of starting points of the upper domain dividing parts 242 of the adjacent upper pixel portion.

In FIG. 7, the upper domain dividing parts 242 are connected to each other in the first direction so that the domains adjacent to each other in the first direction and formed between the first and second substrates 100 and 200 are connected to each other along adjacent pixels 'A'. That is, the domains are not formed in each of the pixels 'A', but the domains formed along the adjacent pixels 'A' are connected to each other.

In the illustrated exemplary embodiments, the domains are formed in the adjacent pixels 'A' so that the dark line on the boundary between the adjacent pixels 'A' is decreased, thereby improving the opening ratio of the pixels 'A'.

Figure 8:
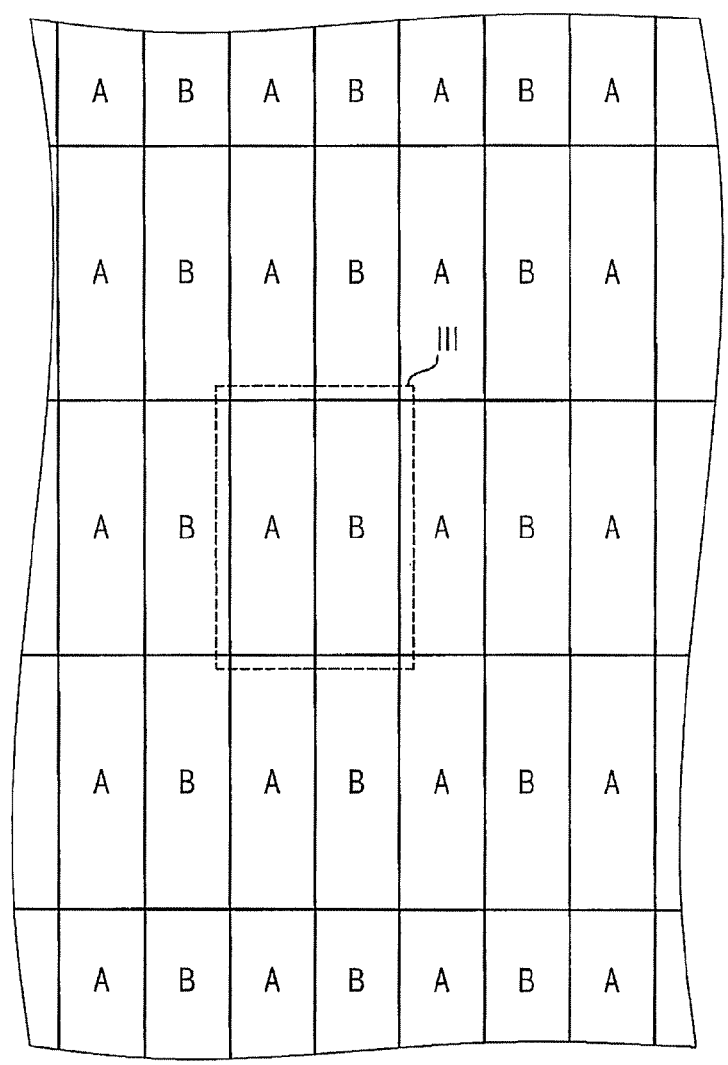
FIG. 8 is a plan view illustrating another exemplary embodiment of pixels of a display panel in accordance with the present invention.

The display panel of FIG. 8 is substantially same as in FIGS. 1 to 7 except a pixel electrode, a lower domain dividing portion, a common electrode and an upper domain dividing portion. Thus, the same reference numerals will be used to refer to the same or like parts as those described in FIGS. 1 to 7 and any further explanations concerning the above elements will be omitted.

FIG. 8 is a plan view illustrating another exemplary embodiment of pixels of a display panel in accordance with the present invention.

Referring to FIG. 8, the display panel 500 includes a plurality of pixels arranged in a matrix shape. A pair of the pixels has a substantially same shape as an adjacent pair of pixels that are adjacent in first and/or second directions. The pair of the pixels includes a first pixel 'A' and a second pixel 'B' that is adjacent to the first pixel 'A' in a first direction. The second direction is substantially in perpendicular to the first direction.

In particular, the first and second pixels 'A' and 'B' are alternately arranged in the first direction. However, the first pixels 'A' are aligned in the second direction, in sequence, and the second pixels 'B' are also aligned in the second direction, in sequence.

Each of the pixels 'A' and 'B' includes a lower pixel portion formed on a first substrate 100 and an upper pixel portion formed on a second substrate 200. The upper pixel portion corresponds to the lower pixel portion in location and/or dimension. The pixels include the first and second pixels 'A' and 'B'. In particular, the first pixel 'A' includes a first lower pixel portion and a first upper pixel portion, and the second pixel B includes a second lower pixel portion and a second upper pixel portion.

Figure 9:
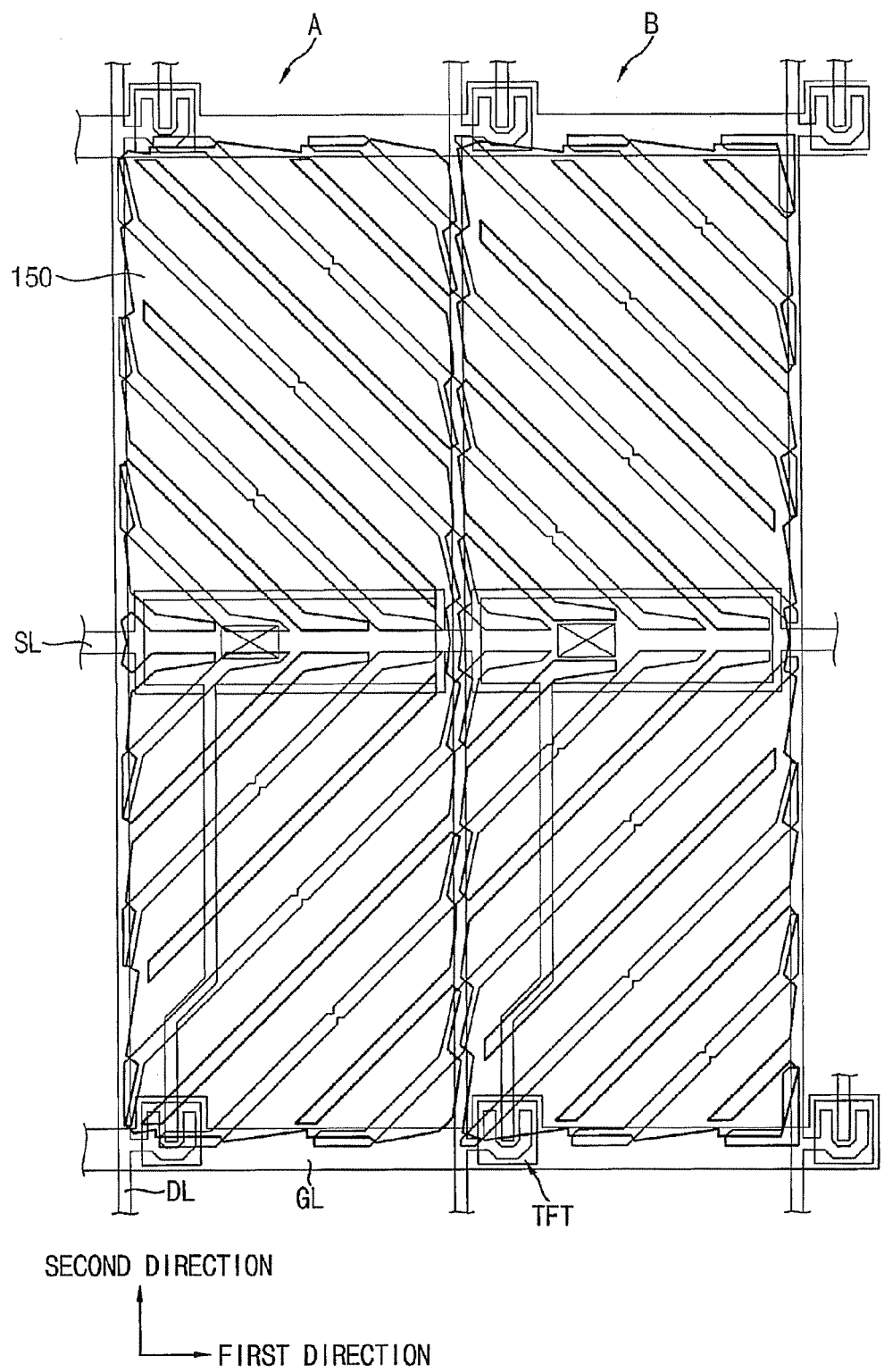
FIG. 9 is an enlarged plan view illustrating portion 'III' shown in FIG. 8.
Figure 10:
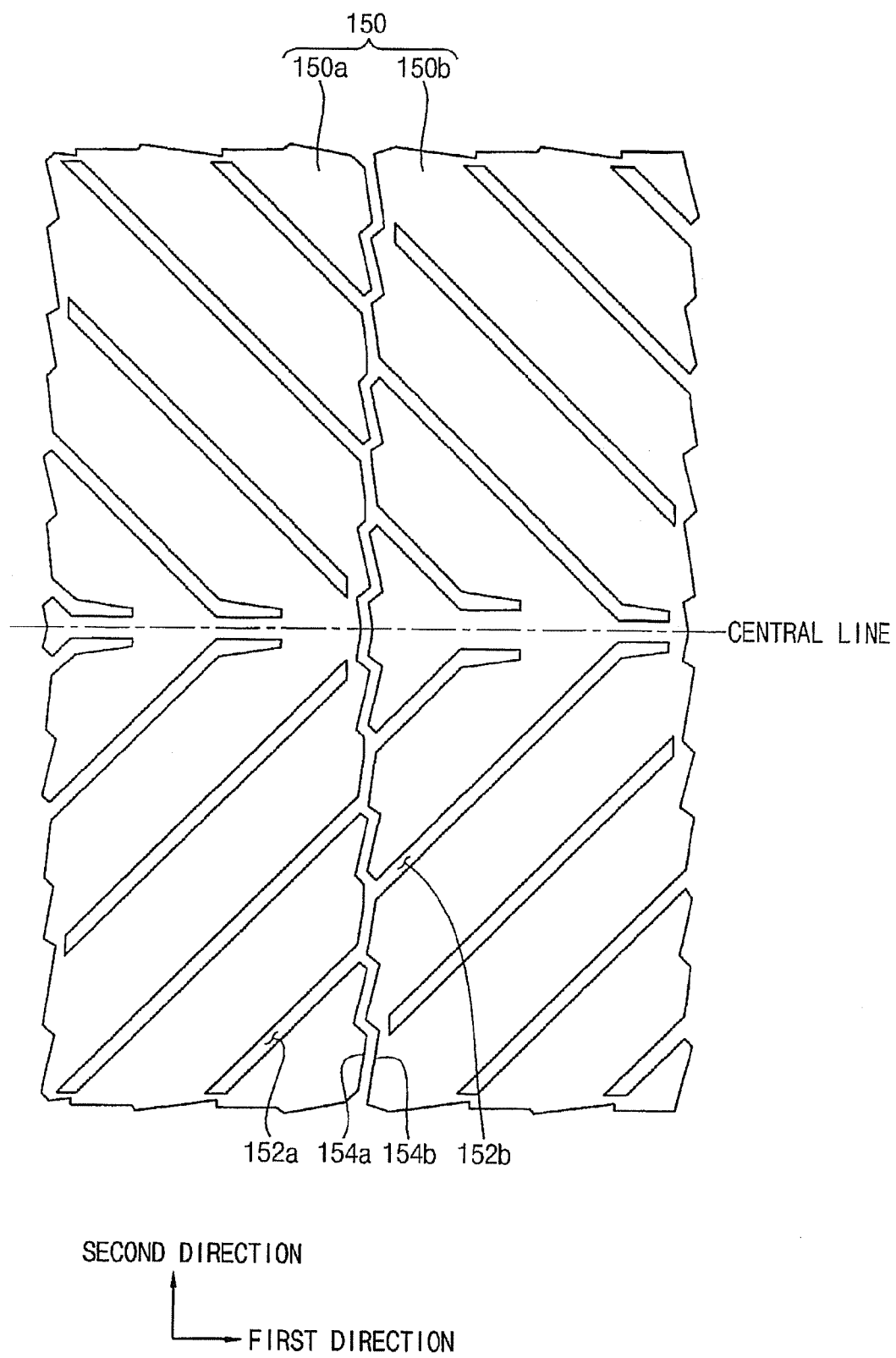
FIG. 10 is a plan view illustrating an exemplary embodiment of a pixel electrode of the unit pixel shown in FIG. 9.
Figure 11:
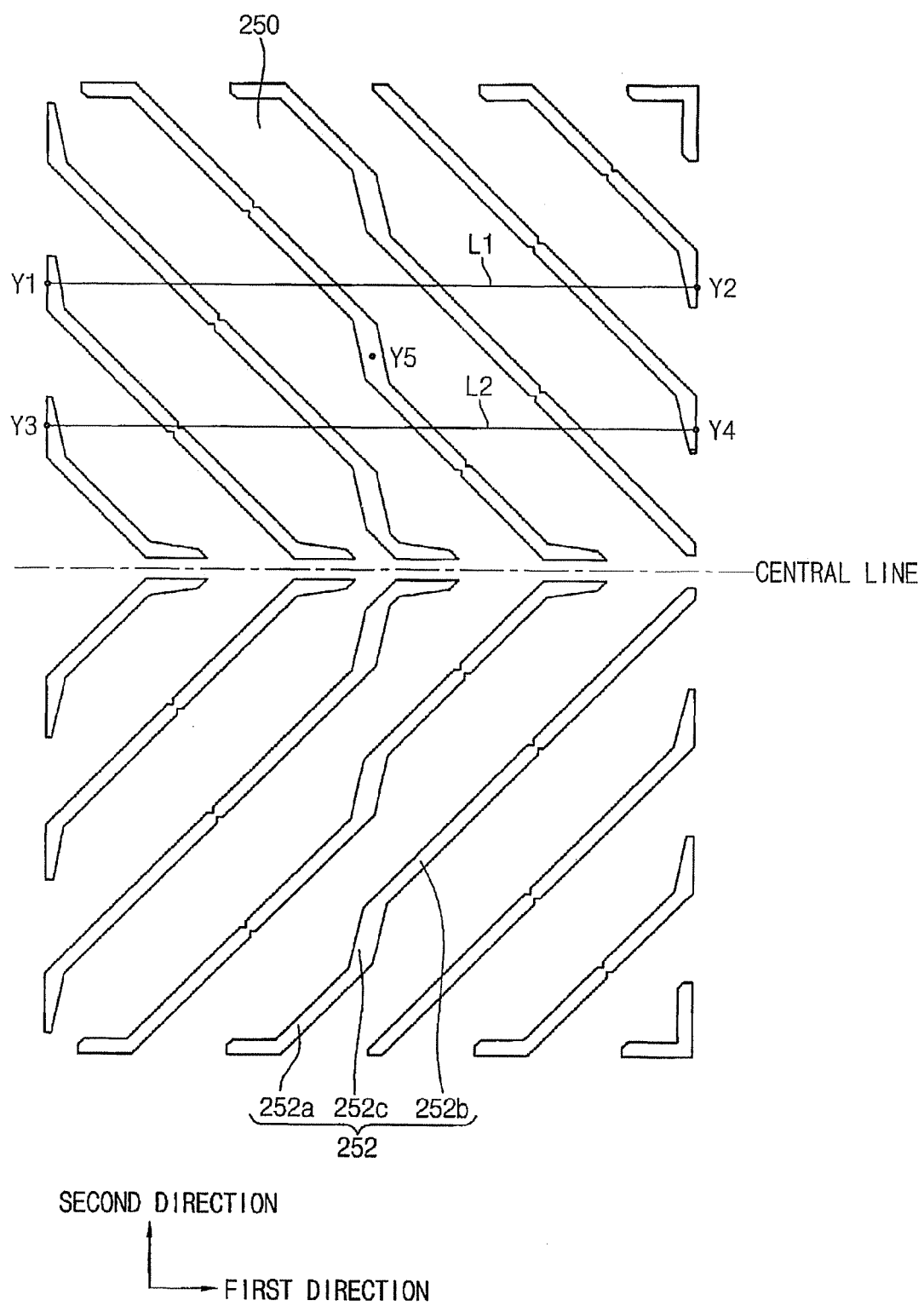
FIG. 11 is a plan view illustrating an exemplary embodiment of a common electrode of the unit pixel shown in FIG. 9.

FIG. 9 is an enlarged plan view illustrating portion 'III' shown in FIG. 8. FIG. 10 is a plan view illustrating an exemplary embodiment of a pixel electrode of the unit pixel shown in FIG. 9. FIG. 11 is a plan view illustrating an exemplary embodiment of a common electrode of the unit pixel shown in FIG. 9.

Referring to FIGS. 9 and 10, pixel electrodes 150 include a first pixel electrode 150a and a second pixel electrode 150b. The first pixel electrode 150a is formed on the first lower pixel portion and the second pixel electrode 150b is formed on the second lower pixel portion.

A first lower domain dividing part 152a is formed in the first pixel electrode 150a and a second lower domain dividing part 152b is formed in the second pixel electrode 150b. In alternative exemplary embodiments, a plurality of first lower domain driving portion 152a may be formed in the first pixel electrode 150a and a plurality of second lower domain driving portion 152b may be formed in the second pixel electrode 150b. The first lower domain dividing parts 152a are openings from which the first pixel electrode 150a is partially etched and the second lower domain dividing parts 152b are openings from which the second pixel electrode 150b is partially etched.

The first lower domain dividing part 152a has a different shape from the second lower domain dividing part 152b in a pair of pixels 150. However, the first and second lower domain driving parts 152a and 152b of one pair of pixels have a substantially same shape as adjacent first and second lower domain driving parts 152a and 152b of an adjacent pair of pixels 150 in the first direction.

Each of the first and second lower domain dividing parts 152a and 152b forms a predetermined angle with respect to the first direction and the first and second lower domain dividing parts 152a and 152b are spaced apart from each other in a direction perpendicular to a longitudinal direction of the lower domain dividing parts 152a and 152b. In one exemplary embodiment, each of the first and second lower domain dividing parts 152a and 152b forms an angle of about 45 degrees with respect to the first direction and the first and second lower domain dividing parts 152a and 152b are spaced apart from each other by a distance of about 44 µm to about 52 µm. In addition, each of the first and second lower domain dividing parts 152a and 152b is substantially symmetric with respect to a central line of each of the pixels. The central line is substantially in parallel with the first direction.

Each of the first and second pixel electrodes 150a and 150b is divided by the first and second lower domain dividing parts 152a and 152b, respectively, to form a plurality of sub pixel electrode portions. For example, the first pixel electrode 150a is not completely divided by the first lower domain dividing part 152a so that the sub pixel electrode portions of the first pixel electrode 150a are electrically connected to each other. The second pixel electrode 150b is not completely divided by the second lower domain dividing part 152b so that the sub pixel electrode portions of the second pixel electrode 150b are electrically connected to each other.

A first side 154a of the first pixel electrode 150a and a second side 154b of the second pixel electrode 150b facing the first side 154a may have substantially a zigzag shape. That is, each of the first and second sides 154a and 154b of the first and second pixel electrodes 150a and 150b, respectively, are not a straight line in substantially parallel with the first direction or the second direction. A plurality of inclined lines with respect to the first direction or the second direction are connected to each other to form the zigzag shape. In addition, the first and second sides 154a and 154b are spaced apart from each other and correspond to each other in location and/or size.

Referring to FIGS. 9 and 11, a plurality of upper domain dividing parts 252 is formed in the common electrode 250. The upper domain dividing parts 252 are openings from which the common electrode 250 is partially etched.

The upper domain dividing parts 252 include a first upper domain dividing part 252a, a second upper domain dividing part 252b and an upper connection dividing part 252c. The first upper domain dividing part 252a is formed on the first upper pixel and the second upper domain dividing part 252b is formed on the second upper pixel. The upper connection dividing part 252c connects the first upper domain dividing part 252a to the second upper domain dividing part 252b. In alternative exemplary embodiments, the upper domain dividing parts 252 may include a plurality of first upper domain dividing parts 252a, a plurality of second upper domain dividing part 252b and a plurality of upper connection dividing parts 252c.

Each of the first and second upper domain dividing parts 252a and 252b forms a predetermined angle with respect to a first direction. The first and second upper domain dividing parts 252a and 252b are spaced apart from each other in a direction perpendicular to a longitudinal direction of the first and second upper domain dividing parts 252a and 252b. In one exemplary, each of the first and second upper domain dividing parts 252a and 252b forms an angle of about 45 degrees with respect to the first direction and the first and second upper domain dividing parts 252a and 252b are spaced apart from each other by a distance of about 44 µm to about 52 µm. In addition, each of the first and second upper domain dividing parts 252a and 252b is substantially symmetric with respect to a central line of each of the first and second upper pixel portions.

The upper connection dividing part 252c is interposed between the first and second upper pixel portions to connect the first upper domain dividing part 252a to the second upper domain dividing part 252b. The upper connection dividing part 252c is aligned in different directions (or at different angles with respect to the first direction) from the first and second upper domain dividing parts 252a and 252b. The upper connection dividing part 252c has a greater width than the first and second domain dividing parts 252a and 252b.

The first and second upper domain dividing parts 252a and 252b have different shapes from each other in adjacent pixel portions. The first and second upper domain dividing parts 252a and 252b having different shapes are adjacent to each other and are aligned in the first direction. The first and second upper domain dividing parts 252a and 252b of one pixel pair have a substantially same shape as the adjacent first and second upper domain dividing parts (not shown) of an adjacent pixel pair, respectively.

As in the illustrated exemplary embodiment, a first starting point Y1 of the upper domain dividing part 252 of the first upper pixel portion and a first ending point Y2 of the upper domain dividing part 252 of the second upper pixel portion are on a first line L1 substantially in parallel with the first direction.

In addition, a second starting point Y3 of the upper domain dividing part 252 of the first upper pixel portion and a second ending point Y4 of the upper domain dividing part 252 of the second upper pixel portion are on a second line L2 substantially in parallel with the first direction. Thus, each of the starting points of the upper domain dividing part 252 of the first upper pixel portion and each of the corresponding ending points of the upper domain dividing part 252 of the second upper pixel portion are on a line substantially in parallel with the first direction.

However, each of the starting points of the upper domain dividing part 252 of the first upper pixel portion and each of starting points of the upper domain dividing part 252 of the second upper pixel portion are not on a line substantially in parallel with the first direction. Each of the starting points of the upper domain dividing part 252 of the second upper pixel portion may be considered each of ending points of the upper domain dividing part 252 of the first upper pixel portion. As in the illustrated exemplary embodiment, one starting point Y5 of the upper domain dividing part 252 of the second upper pixel portion is interposed between the first and second lines L1 and L2 on which the first and second starting points Y1 and Y3 are disposed. The first starting point Y1 and the "ending" point Y5 is not on a line substantially in parallel with the first direction.

Hereinafter, the display panel of FIGS. 8 to 11 is compared with the display panel shown in FIGS. 1 to 7.

In FIGS. 1 to 7, the lower domain dividing parts 142 or the upper domain dividing parts 242 may be spaced apart from each other by the distance of about 44 µm to about 52 µm. When the lower domain dividing parts 142 are spaced apart from each other by the distance of about 44 µm to about 52 µm, the opening ratio and a response speed of liquid crystals of the display panel 400 are increased. In one exemplary embodiment, the opening ratio of the lower domain dividing parts 142 is about 4.9% and the response speed of the liquid crystals is no more than about 16 milliseconds (ms). When the distance between the lower domain dividing parts 142 is increased, the opening ratio is increased and the response speed of the liquid crystals is decreased. In addition, when the distance between the lower domain dividing parts 142 is decreased, the opening ratio is decreased and the response speed of the liquid crystals is increased.

Thus, in order to optimize the opening ratio and the response speed of the liquid crystals of the display panel 400, the distance between the lower domain dividing parts 142 and/or between the upper domain dividing parts 242 is about 44µ to about 52 µm.

The display panel includes the pixels having a predetermined size. In one exemplary embodiment, the size of each of the pixels of the display panel may be 124 µm×372 µm, 140.5 µm×421.5 µm, 216 µm×268 µm or 248.5 µm×745.5 µm.

When each of the pixels of the display panel has the predetermined size, the distance between each of the lower domain dividing parts and/or between each of the upper domain dividing parts is restricted. Consequently, the opening ratio and the response speed of the liquid crystals are restricted based on the size of each pixels of the display panel. That is, the distance between the lower domain dividing parts or between the upper domain dividing parts may not be optimized so that the opening ratio and the response speed of the liquid crystals of the display panel may also not be optimized.

Referring again to FIGS. 1 to 7, the pixels have a substantially same shape so that the lower domain dividing parts have a substantially same shape and the upper domain dividing parts have a substantially same shape in each pixel.

In order to optimize the opening ratio and the response speed of the liquid crystals of the display panel 400, the distance between the lower domain dividing parts 142 or between the upper domain dividing parts 242 should be optimized. However, in FIGS. 1 to 7, the distance between the lower domain dividing parts 142 and/or between the upper domain dividing parts 242 is restricted so that the distance may not be optimized. As a result, the opening ratio and the response speed of the liquid crystals of the display panel 400 may not be optimized.

In comparison, in FIGS. 8 to 11, the lower domain dividing parts 152 on two adjacent pixels in the first direction are connected to each other, and the upper domain dividing parts 252 on two adjacent pixels in the first direction are connected to each other. When the lower domain dividing parts 152 in the two adjacent pixels are connected to each other and the upper domain dividing parts 252 in the two adjacent pixels are connected to each other, the distance between the lower domain dividing parts 152 or between the upper domain dividing parts 252 may be changed.

The distance between the lower domain dividing parts 152 or between the upper domain dividing parts 252 may be optimized, thereby optimizing the opening ratio and the response speed of the liquid crystals. That is, the size of the lower domain dividing parts 152 and the upper domain dividing parts 252 is increased to optimize the distance between the lower domain dividing parts 152 or between the upper domain dividing parts 252. In alternative exemplary embodiments, each of the lower domain dividing parts or each of the upper domain dividing parts may be on a plurality of adjacent pixels and the number of the plurality of adjacent pixels may be no less than three.

FIG. 12 is a plan view illustrating another exemplary embodiment of pixels of a display panel in accordance with the present invention. The display panel of FIG. 12 is the same as in FIGS. 8 to 11 except for a pixel electrode. Thus, the same reference numerals will be used to refer to the same or like parts as those described in FIGS. 8 to 11 and any further explanations concerning the above elements will be omitted.

Referring to FIG. 12, the display panel 600 includes a plurality of pixels arranged in a matrix shape. The pixels include a first pixel 'A' and a second pixel 'B'.

The first and second pixels 'A' and 'B' are alternately arranged in a first direction of the display panel 600. In addition, the first and second pixels 'A' and 'B' are also alternately arranged in a second direction of the display panel 600. The second direction is substantially in perpendicular to the first direction.

Hereinafter, an arrangement of the pixels of FIG. 12 will be described with reference to the arrangement of the pixels shown in FIGS. 8 to 11.

The first pixel 'A' has a different shape from the second pixel 'B'. That is, the first and second pixels 'A' and 'B' have the different shape from each other so that the first pixel 'A' may have a different opening ratio from the second pixel 'B'. In FIGS. 8 to 11, the first pixels 'A' are aligned in the second direction, and the second pixels 'B' having different opening ratios are aligned in the second direction so that a vertical line along the second direction may be displayed on the display panel.

However, in FIG. 12, the first and second pixels 'A' and 'B' are alternately arranged in the first and second directions. That is, the first and second pixels 'A' and 'B' are arranged in a dot shape. The first pixels 'A' and the second pixels 'B', respectively, are adjacent in a diagonal direction of the pixels. The first pixels 'A' and the second pixels 'B', respectively are adjacent to each other in a diagonal direction of the pixels. Since the first and second pixels 'A' and 'B' are arranged in a juxtaposition mixture, the vertical line may be reduced or effectively prevented. Advantageously, an image display quality of the display panel is improved.

Figure 13:
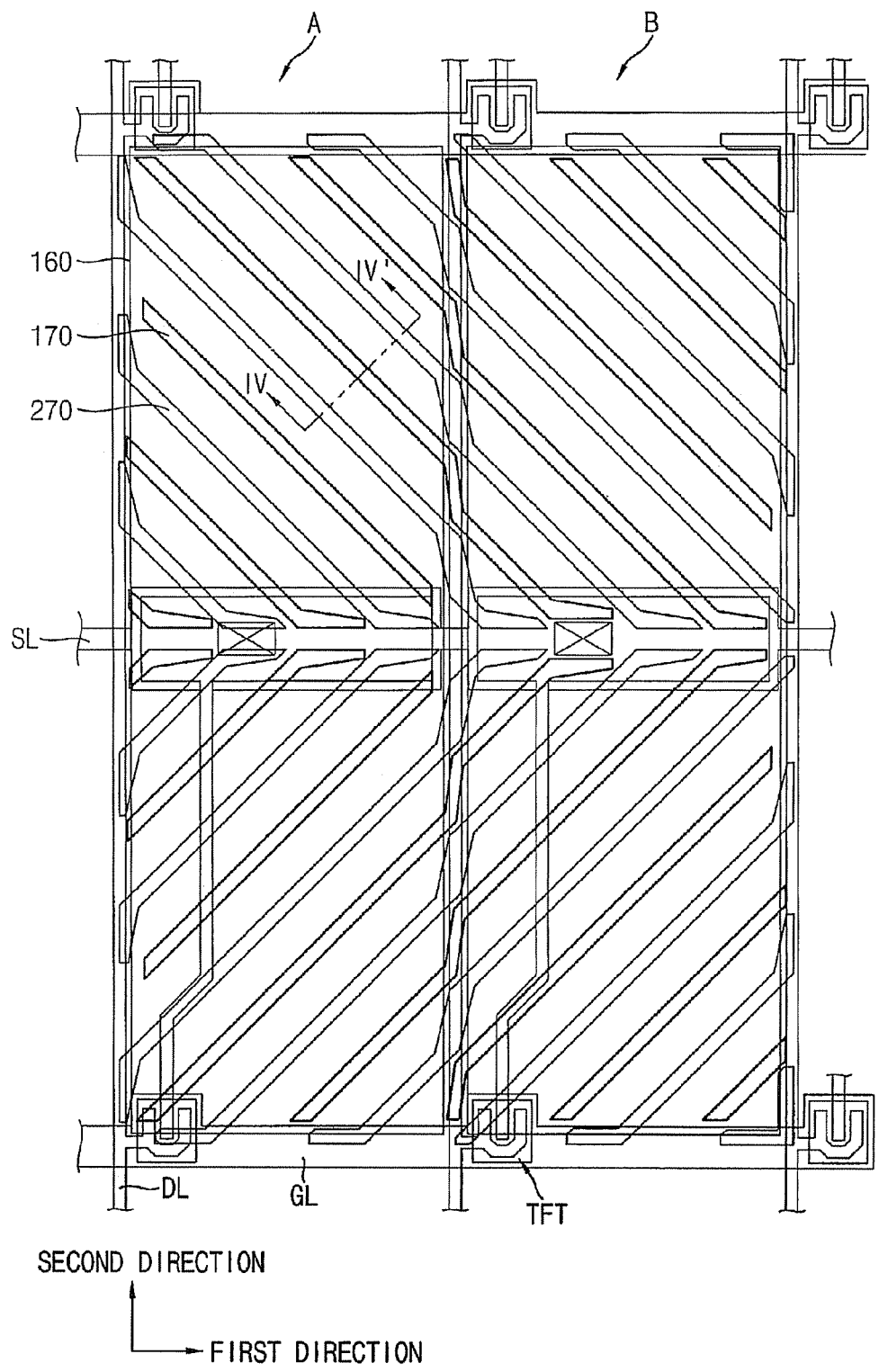
FIG. 13 is a plan view illustrating an exemplary embodiment of a pair of pixels of a display panel in accordance with the present invention.

The display panel of FIG. 13 is the same as in FIGS. 8 to 11 except a pixel electrode, a lower domain dividing portion, a common electrode and an upper domain dividing portion. Thus, the same reference numerals will be used to refer to the same or like parts as those described in FIGS. 8 to 11 and any further explanations concerning the above elements will be omitted.

Figure 14:
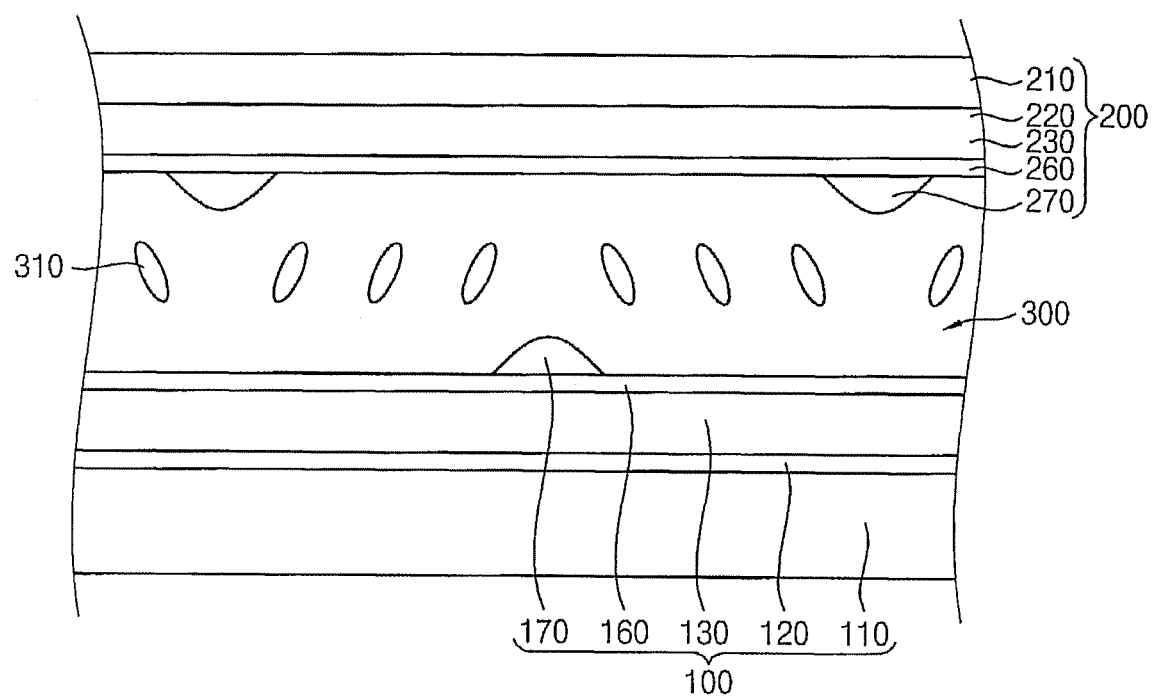
FIG. 14 is a cross-sectional view taken along line IV-IV' shown in FIG. 13.

FIG. 13 is a plan view illustrating another exemplary embodiment of a pair of pixels of a display panel in accordance with the present invention. FIG. 14 is a cross-sectional view taken along line IV-IV' shown in FIG. 13.

Referring to FIGS. 13 and 14, the display panel 700 includes a first substrate 100, a second substrate 200 and a liquid crystal layer 300.

The first substrate 100 includes a first transparent substrate 110, a gate insulating layer 120, a passivation layer 130, a pixel electrode 160 and a lower domain dividing part 170. Alternatively, the first substrate 100 may further include a plurality of pixel electrodes 160 and a plurality of lower domain dividing parts 170.

The pixel electrode 160 is formed on the passivation layer 130 and includes a transparent conductive material. Exemplary embodiment of the transparent conductive material that can be used for the pixel electrode 160 include, but are not limited to, indium tin oxide ("ITO"), indium zinc oxide ("IZO"), amorphous indium tin oxide ("a-ITO"), etc. The pixel electrode 160 is electrically connected to a drain electrode D of a thin film transistor TFT through a contact hole 132.

The lower domain dividing part 170 is formed on the pixel electrode 160. In FIGS. 13 and 14, a plurality of lower domain dividing parts 170 is protruded from each of the pixel electrodes 160. In one exemplary embodiment, the lower domain dividing part 170 includes photoresist and may be formed through a photo process using a mask.

The second substrate 200 includes a second transparent substrate 210, a black matrix (not shown), a color filter 220, an overcoating layer 230 and an upper domain dividing part 270. In exemplary embodiments, the second substrate 200 may further include a plurality of color filters 220 and a plurality of upper domain dividing parts 270.

The common electrode 260 includes a transparent conductive material and is formed on the overcoating layer 230. Exemplary embodiment of the transparent conductive material that can be used for the common electrode 260 include, but are not limited to, indium tin oxide ("ITO"), indium zinc oxide ("IZO"), amorphous indium tin oxide ("a-ITO"), etc. When a voltage difference is applied to the common electrode 260 and the pixel electrode 160, an electric field is formed between the common electrode 260 and the pixel electrode 160.

The upper domain dividing part 270 is formed on the common electrode 260. As in the illustrated exemplary embodiment, a plurality of upper domain dividing parts 270 is protruded from the common electrode 260 at a predetermined height. In one exemplary embodiment, the upper domain dividing part 270 includes photoresist and may be formed through a photo process.

The lower domain dividing parts 170 are alternately arranged with the upper domain dividing parts 270 to form a plurality of domains between the first and second substrates 100 and 200. Each of the upper domain dividing parts 270 are on substantially a center of the adjacent lower domain dividing parts 170 and each of the lower domain dividing parts 170 is substantially on a center of the adjacent upper domain driving parts 270. Each of the upper domain dividing part 270 and an adjacent lower domain dividing part 170 that is adjacent to the upper domain dividing part 270 define a domain.

The liquid crystals 310 interposed between the first and second substrates 100 and 200 are aligned in various directions in the domains. The liquid crystals 310 are inclined by the lower domain dividing parts 170 that is protruded from the pixel electrode 160 and by the upper domain dividing parts 270 that are protruded from the common electrode 260. The liquid crystals 310 at sides of the lower domain dividing parts 170 and at sides of the upper domain dividing parts 270 may be inclined in different directions. When the liquid crystals 310 are aligned in the various directions, a viewing angle of the display panel 700 is increased.

Figure 15:
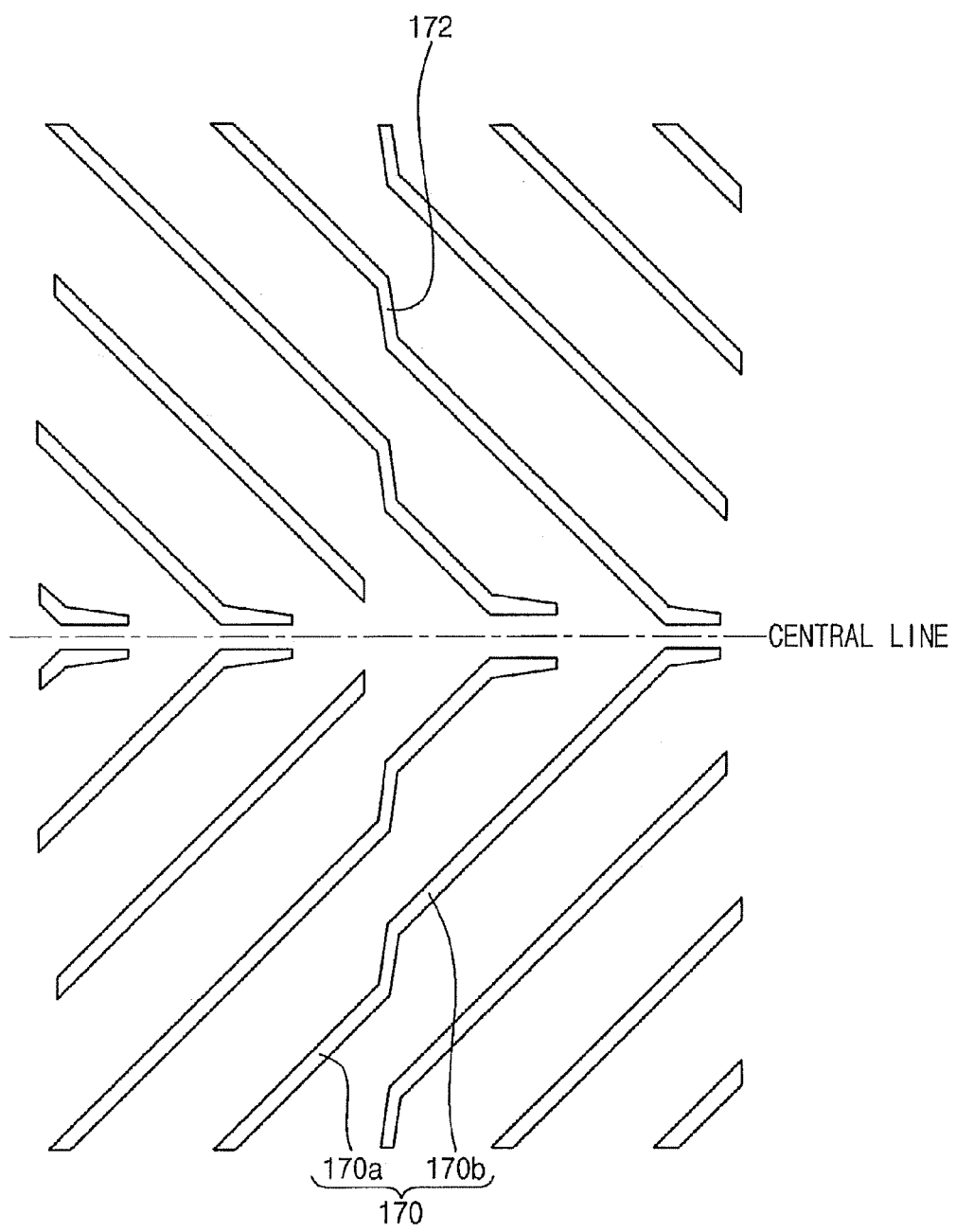
FIG. 15 is a plan view illustrating an exemplary embodiment of a lower domain dividing part of the pixel shown in FIG. 13.

FIG. 15 is a plan view illustrating an exemplary embodiment of a lower domain dividing part of the pixel shown in FIG. 13.

Referring to FIGS. 13 and 15, each of the lower domain dividing parts 170 includes a first lower domain dividing portion 170a and a second lower domain dividing portion 170b. The first lower domain dividing portion 170a is formed in the first pixel 'A' and the second lower domain dividing portion 170b is formed in the second pixel 'B'. In alternative exemplary embodiments, a plurality of the first lower domain dividing portions 170a may be formed in the first pixel 'A' and a plurality of the second lower domain dividing portions 170b may be formed in the second pixel 'B'.

Each of the first and second lower domain dividing portions 170a and 170b is a protrusion that is protruded from the pixel electrode 160. Each of the first and second lower domain dividing portions 170a and 170b is substantially symmetric with respect to a central line of the pixel electrode 160. Each of the first and second lower domain dividing portions 170a and 170b forms a predetermined angle with respect to the central line of the pixel electrode 160.

The first and second lower domain dividing portions 170a and 170b are connected to each other in the first direction. A portion of the first lower domain dividing portion 170a is connected to the adjacent second lower domain dividing portion 170b. In FIG. 15, a lower domain connection part 172 connects the first lower domain dividing portion 170a to the second lower domain dividing portion 170b.

The first and second lower domain dividing portions 170a and 170b have different shapes from each other. The first and second lower domain dividing portions 170a and 170b having the different shapes are aligned in the first direction. The first and second lower domain dividing portions 170a and 170b of the lower domain dividing part 170 have a substantially same shape as adjacent first and second lower domain dividing portions 170a and 170b in the first direction.

Figure 16:
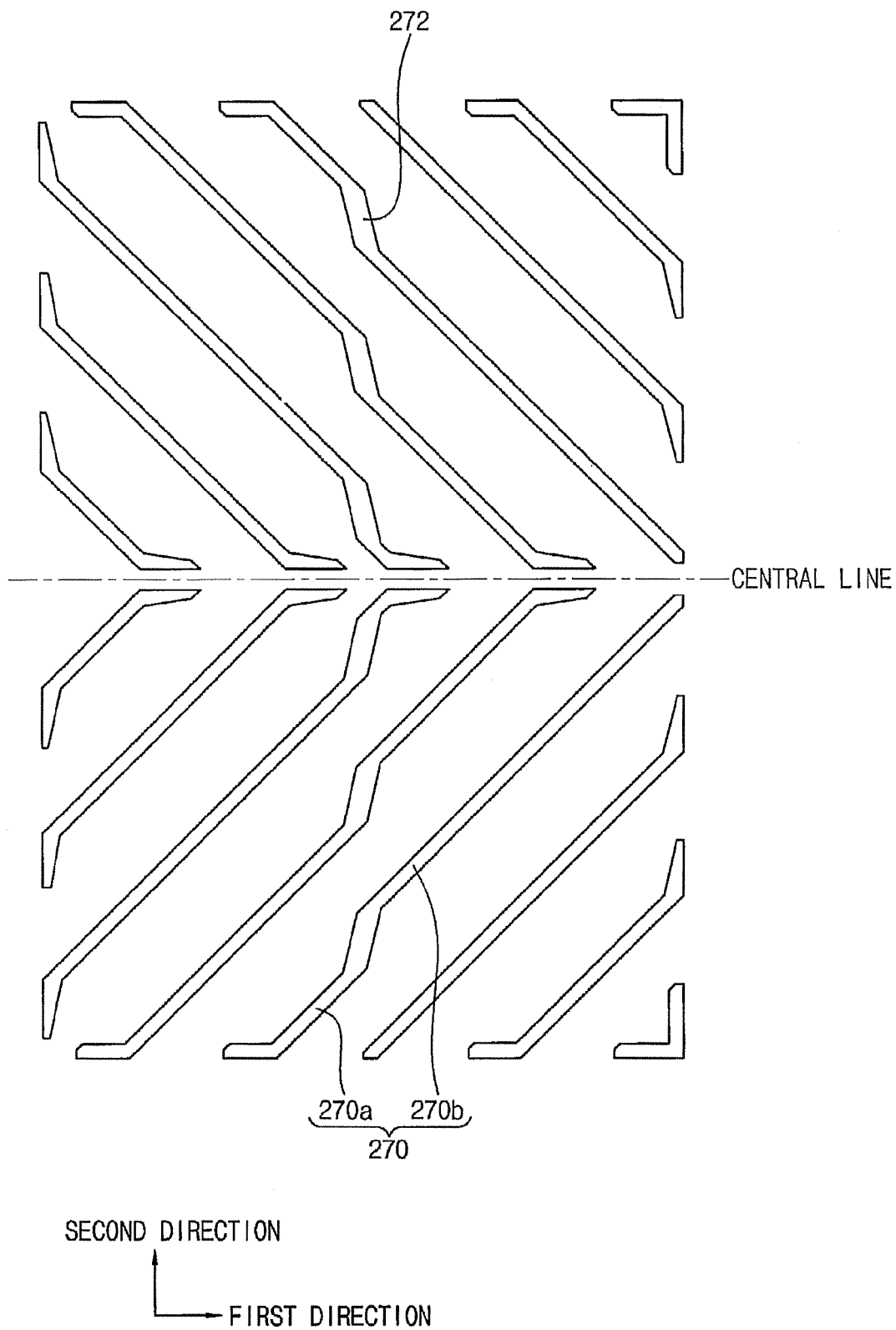
FIG. 16 is a plan view illustrating an exemplary embodiment of an upper domain dividing part of the pixel shown in FIG. 13.

FIG. 16 is a plan view illustrating an exemplary embodiment of an upper domain dividing part of the pixel shown in FIG. 13.

Referring to FIGS. 13 and 16, the upper domain dividing part 270 includes a first upper domain dividing portion 270a and a second upper domain dividing portion 270b. The first upper domain dividing portion 270a is on the first pixel 'A', and the second upper domain dividing portion 270b is on the second pixel 'B'.

Each of the first upper domain dividing portion 270a is substantially on a center between the adjacent first lower domain dividing portion 170a and each of the second upper domain dividing portion 270b is substantially on a center between the adjacent second lower domain dividing portion 170b.

Each of the first and second upper domain dividing portions 270a and 270b includes a protrusion that is formed on the common electrode 260. Each of the first and second upper domain dividing portions 270a and 270b is substantially symmetric with respect to a central line of each of the pixels and is inclined with respect to the central line.

The first and second upper domain dividing portions 270a and 270b are connected to each other in the first direction. A portion of the first upper domain dividing portion 270a is connected to a portion of the second domain dividing portions 270b. An upper domain connecting portion 272 connects the first upper domain dividing portion 270a to the second upper domain dividing portion 270b.

The first upper domain dividing portions 270a of pixel 'A' and the and second upper domain dividing portions 270b of pixel 'B' have different shapes. The first and second upper domain dividing portions 270a and 270b having the different shape are adjacent to each other (in adjacent pixels 'A' and 'B') and are aligned in the first direction. The first and second upper domain dividing portions 270a and 270b of a pair of pixels 'A' and 'B' have a substantially same shape as the adjacent first and second upper domain dividing portions (not shown) of an adjacent pair of pixels 'A' and 'B'. The first and second upper domain dividing portions 270a and 270b of the pair of pixels are aligned in the first direction with the adjacent first and second upper domain dividing portions of the adjacent pair of pixels.

In FIGS. 13 to 16, the lower domain dividing part 170 is protruded from the pixel electrode 160 at a predetermined height and the upper domain dividing part 270 is protruded from the common electrode 260 at a predetermined height so that the domains are formed between the first and second substrates 100 and 200. The liquid crystals 310 interposed between the first and second substrates 100 and 200 are aligned in various directions corresponding to the domains, thereby increasing a viewing angle of the display panel 700.

In FIGS. 13 to 16, the lower and upper domain dividing parts 170 and 270 are the protrusions. In alternative exemplary embodiments, one of the lower and upper domain dividing parts 170 and 270 may be the protrusion and another of the lower and the upper domain dividing parts 170 and 270 may be opening from which the pixel electrode 160 or the common electrode 260 is partially etched.

In the illustrated exemplary embodiments, the upper domain dividing parts aligned in the first direction are connected to each other so that the domains formed between the first and second substrates may be formed through the adjacent pixels, thereby improving the opening ratio of the display panel.

As in the illustrated embodiments, the lower and upper domain dividing parts of the display panel may have the substantially same shape in each of the pixels or may have the substantially same shape in each pair of adjacent two pixels. Each of the lower domain dividing parts may be connected to the adjacent domain dividing part. The distance between the lower domain dividing parts and the distance between the upper domain dividing parts are adjusted so that the opening ratio and the response speed of the liquid crystals may be optimized.

Advantageously, the opening ratio of the display panel is improved and the response speed of the liquid crystals is optimized, thereby improving the image display quality.

This invention has been described with reference to the example embodiments. It is evident, however, that many alternative modifications and variations will be apparent to those having skill in the art in light of the foregoing description. Accordingly, the present invention embraces all such alternative modifications and variations as fall within the spirit and scope of the appended claims.

What is claimed is:

1. A display panel comprising:
   a first substrate including a plurality of pixel electrodes in a plurality of lower pixel portions, respectively, each of the pixel electrodes including a plurality of lower domain dividing parts spaced apart from each other, a side of each of the pixel electrodes has a zigzag shape;
   a second substrate including a common electrode including a plurality of upper domain dividing parts spaced apart from each other in a plurality of upper pixel portions corresponding to the lower pixel portions, respectively, the upper domain dividing parts being connected to each other between adjacent upper pixel portions in a first direction; and
   a liquid crystal layer interposed between the first and second substrates,
   wherein a portion of the side of each of the pixel electrodes and a portion of the upper domain dividing parts which are partially overlapped with each other between the adjacent upper pixel portions, have substantially the same slope, and
   wherein the upper domain dividing parts comprise a plurality of upper main domain dividing parts in the upper pixel portions and an upper connection domain dividing part between the adjacent upper pixel portions connecting the upper main domain dividing parts.

2. The display panel of claim 1, wherein the upper pixel portions are arranged in a matrix shape in the first direction and a second direction that is substantially in perpendicular to the first direction, and the upper domain dividing parts in each of the upper pixel portions have a substantially same shape as the upper domain dividing parts in an adjacent upper pixel portion.

3. The display panel of claim 1, wherein the upper pixel portions are arranged in a matrix shape in the first direction and a second direction that is substantially in perpendicular to the first direction, and the upper domain dividing parts in every two of the upper pixel portions have a substantially same shape as the upper domain dividing parts in adjacent two upper pixel portions that are adjacent in the first direction.

4. The display panel of claim 3, wherein the upper pixel portions comprises a first upper pixel portion and a second upper pixel portion adjacent to the first upper pixel portion, and a plurality of first upper domain dividing parts on the first upper pixel portion have a different shape from a plurality of second upper domain dividing parts on the second upper pixel portion.

5. The display panel of claim 4, wherein each of a plurality of starting points of the second upper domain dividing parts is on a center between lines extended from adjacent starting points of the first upper domain dividing parts in the first direction.

6. The display panel of claim 4, wherein the first and second upper pixel portions are alternately arranged in the first direction and in the second direction.

7. The display panel of claim 1, wherein the upper connection domain dividing part is extended in a direction different from a longitudinal direction of each of the upper main domain dividing parts.

8. The display panel of claim 1, wherein the upper connection domain dividing part has a greater width than each of the upper main domain dividing parts.

9. The display panel of claim 1, wherein the upper domain dividing parts are extended in a direction inclined with respect to the first direction.

10. The display panel of claim 9, wherein the lower domain dividing parts are extended in a direction substantially in parallel with the extended direction of the upper domain dividing parts and each of the lower domain dividing parts is interposed between adjacent upper domain dividing parts.

11. The display panel of claim 1, wherein the upper domain dividing parts are substantially symmetric with respect to a central line of each of the upper pixel portions, the central line being substantially in parallel with the first direction.

12. The display panel of claim 1, wherein a distance between adjacent upper domain dividing parts is about 44 micrometers (μm) to about 52 micrometers (μm).

13. The display panel of claim 1, wherein the second substrate further comprises a plurality of color filters formed in the upper pixel portions and displaying colors.

14. The display panel of claim 1, wherein the lower domain dividing parts comprise a plurality of openings from which the pixel electrodes are partially removed and the upper domain dividing parts comprise a plurality of openings from which the common electrode is partially removed.

15. A display panel comprising:
a first substrate including:
   a lower substrate including a plurality of lower pixel portions;
   a plurality of thin film transistors on the lower pixel portions;
   a plurality of pixel electrodes electrically connected to the thin film transistors, respectively; and
   a plurality of lower domain dividing parts formed in the lower pixel portions, the lower domain dividing parts being spaced apart from each other;
a second substrate including:
   an upper substrate;
   a common electrode on a substantially entire surface of the upper substrate;
   a plurality of upper domain dividing parts spaced apart from each other in a plurality of upper pixel portions corresponding to the lower pixel portions, respectively, the upper domain dividing parts and the lower domain dividing parts defining a plurality of domains, the upper domain dividing parts being connected to each other in adjacent upper pixel portions that are adjacent to each other in a first direction; and
a liquid crystal layer interposed between the first and second substrates,
wherein the lower domain dividing parts and the upper domain dividing parts which are partially overlapped with each other between the adjacent upper pixel portions, have substantially the same slope between the adjacent upper pixel portions, and
wherein the upper domain dividing parts comprise a plurality of upper main domain dividing parts in the upper pixel portions and an upper connection domain dividing part between the adjacent upper pixel portions connecting the upper main domain dividing parts.

16. The display panel of claim 15, wherein the lower domain dividing parts comprise a plurality of openings from which the pixel electrodes are partially removed and the upper domain dividing parts comprise a plurality of openings from which the common electrode is partially removed.

17. The display panel of claim 15, wherein the lower domain dividing parts comprise a plurality of protrusions protruded from the pixel electrodes and the upper domain dividing parts comprise a plurality of protrusions protruded from the common electrode.

18. The display panel of claim 15, wherein a portion of the lower and upper domain dividing parts comprises a protrusion and a remaining portion of the lower and upper domain dividing parts comprises an opening from which the pixel electrodes or the common electrode is partially removed, respectively.

19. The display panel of claim 15, wherein the lower domain dividing parts are interposed between adjacent upper domain dividing parts.

* * * * *